United States Patent
Bauer

(10) Patent No.: US 10,441,918 B2
(45) Date of Patent: Oct. 15, 2019

(54) PROCESS FOR PRODUCING A CATALYST AND CATALYST ARTICLE

(71) Applicant: Johnson Matthey Public Limited Company, London (GB)

(72) Inventor: Juergen Bauer, Redwitz (DE)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/500,548

(22) PCT Filed: Jul. 24, 2015

(86) PCT No.: PCT/GB2015/052161
§ 371 (c)(1),
(2) Date: Jan. 31, 2017

(87) PCT Pub. No.: WO2016/016622
PCT Pub. Date: Feb. 4, 2016

(65) Prior Publication Data
US 2017/0239619 A1    Aug. 24, 2017

(30) Foreign Application Priority Data
Jul. 31, 2014   (DE) .................. 10 2014 215 112

(51) Int. Cl.
*B01J 23/00* (2006.01)
*B01D 53/94* (2006.01)
(Continued)

(52) U.S. Cl.
CPC ......... *B01D 53/9418* (2013.01); *B01D 53/94* (2013.01); *B01J 23/00* (2013.01);
(Continued)

(58) Field of Classification Search
CPC ........ B01D 53/9418; B01D 2255/2065; B01D 2255/20776; B01D 2255/40;
(Continued)

(56) References Cited

U.S. PATENT DOCUMENTS

| 4,077,908 A | 3/1978 | Stenzel et al. |
| 4,663,024 A | 5/1987 | Olson et al. |

(Continued)

FOREIGN PATENT DOCUMENTS

| DE | 102005052016 A1 | 5/2007 |
| DE | 102007031854 A1 | 1/2009 |

(Continued)

OTHER PUBLICATIONS

Aranzabal et al.; Optimization of process parameters on the extrusion of honeycomb shaped monolith of H-ZSM-5 zeolite; Chemical Engineering Journal 162 (2010) 415-423.

(Continued)

*Primary Examiner* — Patricia L. Hailey

(57) ABSTRACT

A process for producing a ceramic catalyst involves the steps of:
a) providing functional particles having a catalytically inactive pore former as a support surrounded by a layer of a catalytically active material,
b) processing the functional particles with inorganic particles to form a catalytic composition,
c) treating the catalytic composition thermally to form a ceramic catalyst, wherein the ceramic catalyst comprises at least porous catalytically inactive cells
which are formed by the pore formers in the functional particles,
which are embedded in a matrix comprising the inorganic particles,
which form a porous structure and
(Continued)

Figure 1:
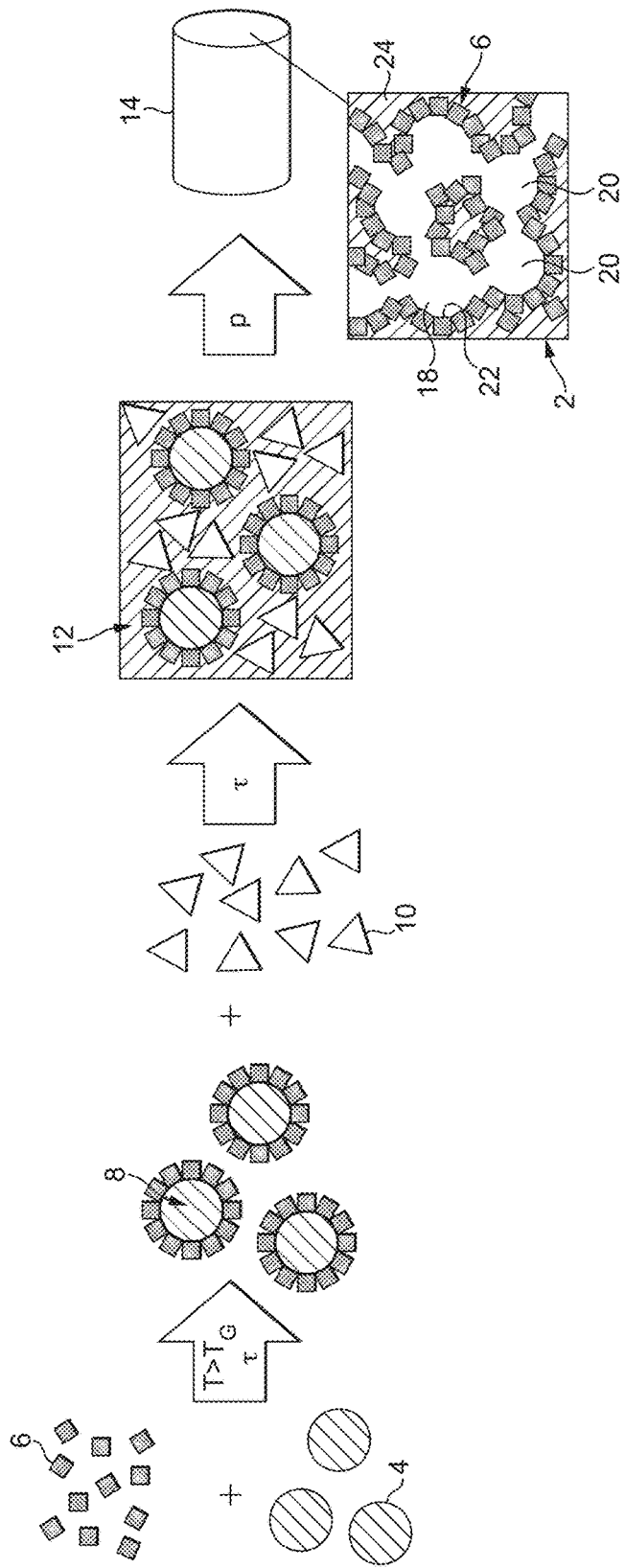

which are at least partly surrounded by an active interface layer comprising the catalytically active material of the layer of the functional particles.

An SCR catalyst produced in by this method has an improved $NO_x$ conversion rate compared to a conventionally produced SCR catalyst.

26 Claims, 6 Drawing Sheets

(51) Int. Cl.
| | |
|---|---|
| B01J 37/02 | (2006.01) |
| B01J 37/04 | (2006.01) |
| B01J 37/08 | (2006.01) |
| B01J 29/76 | (2006.01) |
| B01J 35/00 | (2006.01) |
| B01J 35/04 | (2006.01) |
| B01J 37/00 | (2006.01) |
| C04B 28/00 | (2006.01) |
| C04B 30/00 | (2006.01) |
| C04B 38/00 | (2006.01) |
| F01N 3/20 | (2006.01) |
| F01N 3/28 | (2006.01) |
| B01J 37/32 | (2006.01) |
| C04B 111/00 | (2006.01) |

(52) U.S. Cl.
CPC .......... *B01J 29/763* (2013.01); *B01J 35/008* (2013.01); *B01J 35/04* (2013.01); *B01J 37/0009* (2013.01); *B01J 37/0018* (2013.01); *B01J 37/0215* (2013.01); *B01J 37/0219* (2013.01); *B01J 37/0246* (2013.01); *B01J 37/04* (2013.01); *B01J 37/08* (2013.01); *B01J 37/082* (2013.01); *C04B 28/001* (2013.01); *C04B 28/005* (2013.01); *C04B 30/00* (2013.01); *C04B 38/0051* (2013.01); *F01N 3/2066* (2013.01); *F01N 3/2828* (2013.01); B01D 2255/102 (2013.01); B01D 2255/2065 (2013.01); B01D 2255/20707 (2013.01); B01D 2255/20723 (2013.01); B01D 2255/20738 (2013.01); B01D 2255/20761 (2013.01); B01D 2255/20776 (2013.01); B01D 2255/40 (2013.01); B01D 2255/50 (2013.01); B01D 2255/65 (2013.01); B01D 2255/9155 (2013.01); B01D 2255/9205 (2013.01); B01J 37/32 (2013.01); B01J 2229/186 (2013.01); B01J 2229/42 (2013.01); C04B 2111/0081 (2013.01); C04B 2111/00129 (2013.01)

(58) Field of Classification Search
CPC ......... B01D 2255/50; B01D 2255/9155; B01J 35/04; B01J 37/0009; B01J 37/0215; B01J 37/08; F01N 3/2066; F01N 3/2828

USPC ............ 502/439; 264/45.1, 45.3, 628–630; 428/116, 117, 304.4, 305.5
See application file for complete search history.

(56) References Cited

U.S. PATENT DOCUMENTS

| | | | |
|---|---|---|---|
| 7,052,777 B2* | 5/2006 | Brotzman, Jr. .......... | B01J 2/006 427/216 |
| 7,381,465 B2* | 6/2008 | Torimoto ................. | B01J 13/02 427/215 |
| 8,227,034 B2 | 7/2012 | Schirmeister et al. | |
| 2004/0161596 A1* | 8/2004 | Taoka ................. | B01D 46/2429 428/304.4 |
| 2004/0183055 A1 | 9/2004 | Chartier et al. | |
| 2011/0005211 A1* | 1/2011 | Tissler ................. | B01J 37/0018 60/297 |
| 2011/0033772 A1* | 2/2011 | Tucker .................. | B22F 3/1121 429/479 |
| 2011/0165040 A1 | 7/2011 | Huang et al. | |
| 2011/0212007 A1* | 9/2011 | Lu ........................ | B01J 29/7215 423/213.5 |
| 2017/0239619 A1 | 8/2017 | Bauer | |

FOREIGN PATENT DOCUMENTS

| | | |
|---|---|---|
| DE | 102012011778 A1 | 12/2012 |
| DE | 102011085684 A1 | 5/2015 |
| EP | 16691358 A1 | 6/2006 |
| EP | 2050495 A1 | 4/2009 |
| EP | 2013347 A1 | 9/2009 |
| EP | 2740534 A1 | 6/2014 |
| JP | H09248464 A | 9/1997 |
| WO | 2009001131 A1 | 12/2008 |
| WO | 2009080155 A1 | 7/2009 |
| WO | 2011092517 A1 | 8/2011 |
| WO | 2011092519 A1 | 8/2011 |
| WO | 2012166868 A1 | 12/2012 |
| WO | 2014027207 A1 | 2/2014 |
| WO | 2014100387 A1 | 6/2014 |
| WO | 2015001004 A1 | 1/2015 |
| WO | 2015061736 A1 | 4/2015 |
| WO | 2015110822 A1 | 7/2015 |

OTHER PUBLICATIONS

Serrano et al.; Synthesis strategies in the search for hierarchical zeolites; Chem. Soc. Rev., 2013, 42, 4004.

Rhodes et al.; Hierarchical Assembly of Zeolite Nanoparticles into Ordered Macroporous Monoliths Using Core-Shell Building Blocks; Chem. Mater. 2000, 12, 2832-2834.

Hu et al.; Fabrication and application of inorganic hollow spheres; Chem. Soc. Rev., 2011, 40, 5472-5491.

* cited by examiner

PROCESS FOR PRODUCING A CATALYST AND CATALYST ARTICLE

CROSS-REFERENCE TO RELATED APPLICATIONS

This application claims priority to PCT International Application No. PCT/GB2015/052161, filed on Jul. 24, 2015, which claims priority to German Application No. 102014215112.0, filed on Jul. 31, 2014, and is incorporated herein by reference.

The invention relates to a process for producing a catalyst and to a catalyst article, especially for exhaust gas treatment.

Catalysts are generally used in a wide variety of different technical fields of use to accelerate chemical reactions. A special case is exhaust gas treatment, for example the reduction of the nitrogen oxide levels in exhaust gases, both from stationary combustion systems and mobile combustion systems, especially in motor vehicles. In this context, the known selective catalytic reduction (SCR) is used.

In this method, nitrogen oxides ($NO_x$) are reduced in the presence of ammonia and oxygen to nitrogen. Various catalyst types and systems are known in principle for the acceleration of this reaction. An established class of catalyst is based on a titanium-vanadium catalyst system ($V_2O_5/TiO_2$ or $V_2O_5/WO_3/TiO_2$). Titanium-vanadium catalysts of this kind are used both in stationary systems and in mobile combustion systems. A further class of catalyst which has been the subject of recent attention, especially for mobile use in motor vehicles, is that of catalysts based on crystalline molecular sieves, especially based on zeolites, which are aluminosilicates. In this context are especially what are called iron- or copper-exchanged molecular sieves, preferably having the MFI, BEA or CHA lattice type. For automotive applications, copper-exchanged molecular sieves are preferable.

Other exhaust gas treatment systems comprise the oxidation of carbon monoxide to carbon dioxide and the oxidation of uncombusted hydrocarbons to water (steam) and carbon monoxide (so-called diesel oxidation catalysts, DOCs), or else the cyclic adsorption of nitrogen oxides ($NO_x$) from an exhaust gas from a lean burn engine, followed by a desorption and reduction of $NO_x$ in a hydrocarbon-rich exhaust gas (so-called $NO_x$ traps, also known as $NO_x$ adsorption catalysts, NACs). If the motor vehicle engine is controlled to at least approximately stoichiometric operation, simultaneous catalytic oxidation of carbon monoxide and uncombusted hydrocarbons and the reduction of nitrogen oxides are possible, by means of the so-called three-way catalytic converter.

The catalysts used nowadays in motor vehicles are predominantly based on ceramic honeycomb catalysts. In operation, the exhaust gas to be treated flows through channels in a catalyst body, for example an extruded catalyst body. A basic distinction is made here between what are called all-active extrudates and coated supports, called "washcoats". In the all-active extrudates, a catalytically active catalyst composition forms the extruded body, meaning that the channel walls of the catalyst are formed completely from a catalytically active material. In the washcoats, a catalytically inert extruded support body is coated with the actual catalytically active catalyst material. This is effected, for example, by dipping the extruded support body into a suspension containing the catalyst material.

In principle, the aim for the catalysts is a maximum catalytic activity, i.e. a maximum $NO_x$ conversion in the case of an SCR catalyst.

A crucial factor for maximum catalytic activity is very good contact between the exhaust gas to be treated and the catalytically active material. The catalytic conversion proceeds to a crucial degree in the near-surface region at the walls of the respective flow channel through which the exhaust gas flows. Especially in the case of all-active extrudate honeycomb catalysts, in which all of the extruded body consists of the catalytically active composition, the effect of this is that comparatively large volume regions of the catalyst composition remain unutilized for the $NO_x$ conversion.

As well as these conventional catalysts, there are also combined catalysts in which a filter effect is combined with catalyst effect. For this purpose, for example, what are called wall-flow filters are used, these having been catalytically activated. Wall-flow filters are honeycomb filters having a honeycomb body with an array of crossing porous walls, the walls defining an array of parallel first and second channels extending in longitudinal direction. Said first channels are closed at a first end of the honeycomb body, and said second channels are closed at a second end of the honeycomb body. Said first and second channels may have the same or else a different cross section. If the first and second channels have different cross sections, they are referred to as asymmetric. In this case, the first channels, which have a greater hydraulic diameter than the second channels, adjoin the sides of the second channels. A specific field of use here is that of catalysed soot filters (CSF), which are used especially for the automotive sector.

In the case of use of molecular sieves, especially zeolites, for the catalytically active components—compared, for example, to titanium-vanadium SCR systems—the extrusion of a catalyst composition for production of a shaped body for the catalyst is more difficult, and so a higher proportion of a binder component is required. In the course of thermal sintering of the ceramic catalyst composition, these binder fractions form sinter bridges which are important for the stiffness and intrinsic stability of the final catalyst.

An additional factor is that copper ion-exchanged zeolites, for example, are very expensive compared to titanium-vanadium systems.

Compared to washcoats, a higher catalytic activity is achieved in the case of catalysts made from all-active material, especially in the case of all-active extrudates. However, this is achieved with a distinctly elevated material input of the catalytically active material, such that all-active catalysts of this kind—based on the catalyst composition used—are frequently less efficient than washcoats. The cause of this is ultimately that contact of the exhaust gas to be treated with catalytically active cells, called mass transfer, is required for the catalytic reaction, and the exhaust gas frequently does not penetrate into the solid catalyst walls to the desired degree. In order to improve this penetration or the mass transfer, the walls of the catalyst are typically porous.

A known way of forming the porosity is, for example, to also introduce organic components into the catalyst composition, and these burn out subsequently in the sintering operation and hence form pores within the catalyst volume, as can be inferred, for example, from EP 2050495 A1. Alternatively, it is also possible to add porous inorganic filler particles.

Proceeding from this, it is an object of the invention to specify a process for producing a catalyst and a catalyst in which an improved catalytic efficiency is achieved.

The object is achieved in accordance with a first aspect of the invention by a process for producing a catalyst having the features of Claim 1. In this process, what are called functional particles are first provided, these being formed by a pore former as support, to which has been applied a layer of a catalytically active material. The pore formers therefore have a dual function, namely on the one hand the formation of a pore structure and on the other hand the structuring of the catalytically active material within the catalyst.

These functional particles are then processed with addition of further inorganic components, for example binder components or fillers etc., in a manner known per se to give a catalytic composition. The catalytic composition is finally subjected to a thermal treatment to form the catalyst, so as to form a ceramic body comprising at least porous catalytically inactive cells:

which are formed by the pore formers in the functional particles, which are embedded in a matrix comprising the further inorganic particles, which form a porous structure and which are at least partly surrounded by an active interface layer comprising the catalytically active material of the layer of the functional particles.

These at least porous cells are joined to one another to form the pore structure. The individual cells are formed by free spaces (pores) bounded by the active interface layer, or else partly filled by porous material. The at least porous cells are therefore cells partly filled with porous material, or pores, each bounded by the active interface layer. Accordingly, "pore structure" is understood to mean a cellular structure in which either pores or porous particle regions are joined together to form the cellular structure. This cellular pore structure is formed by the interface layer of the catalytically active material on its inner surface, i.e. the interface to the matrix, at least over broad areas.

The thermal treatment comprises, more particularly, a calcining and/or sintering operation as well, such that a cellular ceramic structure is formed overall. A cellular ceramic structure is understood to mean a 3-dimensional structure which is approximately network- or lattice-like, and in which the material bridges of the network or the lattice are ceramic, and enclose the at least porous cells between them. The individual particles of the active layer are therefore joined to one another ceramically.

According to a second aspect of the invention, a catalyst produced by this process, as defined by Claim 19, is characterized by a composite structure comprising a pore structure which is embedded in the matrix and has at least porous cells which, on account of this production process, are bounded by an active interface layer of catalytically active material. This catalytically active layer is preferably at least substantially free of binder components. The catalytically active material is joined together preferably ceramically, i.e. through formation of sinter bridges.

It is therefore a feature of this catalyst that the walls that bound the at least porous cells consist of the active interface layer of an (as far as possible) purely catalytically active material. This active material is thus preferably free or at least substantially free of binder components. This distinguishes these interface layers from washcoats, in which a high binder content is present in the catalytically active layer. This is because, in these materials, a catalyst composition comprising binder components is applied, and the binder components form, together with the catalytically active material after the sintering operation, a coating which is applied only externally to a surface of a support structure.

In contrast to washcoats, the catalytically active interface layers are therefore present within the volume of the catalyst and form the walls of the pore structure.

Basically, the active interface layer is free or substantially free of binder components. In the production process, however, since the active layer forms an interface to the matrix consisting particularly, at least to a crucial degree, of binder components, binder components can also get into the layers, for example, because of the process parameters (pressure, temperature). Mixing of the components of the binder and of the catalytically active material resulting from the production process cannot be avoided, and so contamination with binder components and/or with catalytically active material occurs in the matrix at the interface. "At least substantially free of binder components" is especially understood to mean that the binder content in the active layer is less than 10% of a hypothetical binder content that would be present in the case of a homogeneous distribution of the binder components in the catalyst. The essentially binder-free, active interface layer already achieves an improved catalytic activity, since a high density of catalytically active material is present in the near-surface region, which simultaneously has good accessibility via the pore structure.

Moreover, the catalyst is characterized in that the catalytically active material is joined ceramically in the active interface layer. The active interface layer comprises and preferably consists of ceramically bonded crystals joined to one another—away from any interface between the catalytically active material and the pore structure accessible by the exhaust gas to be treated—via sinter bridges. The active interface layer is therefore not formed by chemical growth or deposition operations. The specific production process therefore achieves a new class of catalyst having improved properties. At the same time, the production process is comparatively simple and can especially be integrated into conventional process technologies, especially for extruded catalysts. Through the choice of the functional particles, for example the size thereof, the geometry thereof and the proportion thereof, it is possible in a simple manner to adjust the pore structure within wide ranges.

This process and the catalyst are usable in principle for all catalyst types, largely irrespective of the choice of the specific catalytically active material or else of the form of the catalyst itself. Preferably, the catalytically active material used is a material which is used for chemical processes for exhaust gas treatment, especially for selective catalytic reduction.

Preferably, the pore formers are formed from an organic material, i.e. by organic particles. For the organic particles, preference is given to using conventional polymer materials, particularly thermoplastics, for example polystyrene, polyethylene or else cellulose, etc. In the course of thermal treatment, the organic particles escape (burn out), such that the cells take the form of pore cells, such that a pore structure with cells in the form of cavities, bounded by the active interface layer, is formed.

Alternatively, the pore formers can be formed from an inorganic porous material. Pore formers used are therefore inorganic particles. Porous material is understood more particularly to mean that these particles have at least mesoporosity and preferably macroporosity. According to the IUPAC (International Union of Pure and Applied Chemistry) definition, mesoporosity is generally understood to mean pores having a pore size of at least 2 nm to a maximum of 50 nm. Macroporosity covers pores having a pore size>50 nm. The expression "have at least mesoporosity" is therefore generally understood to mean that these particles have a porosity having pores>2 nm. The particles may at the same time also have macroporosity. This porosity with the comparatively large pores likewise effectively results in formation in the final catalyst—similarly to the case of the organic pore formers—of a porous structure with flow channels through which the exhaust gas to be treated can be conducted into deeper layers of the catalyst volume, such that not only the near-surface layers are thus available for the catalytic action, especially in all-active extrudates.

Inorganic porous materials used are appropriately clay materials, preferably a so-called pillared clay material. Such pillared clay materials are also known by the abbreviation PILC. These pillared clay materials generally feature two-dimensional clay layers spaced apart from one another. The spacing is effected by inorganic pillars consisting, for example, of titanium oxide or aluminium oxide. Alternatively, preferably a diatomaceous earth is used as porous inorganic material. Further alternatives used for the inorganic porous material are silica gel or else a porous glass.

To form the layer of the catalytically active material, preferably powder particles of the catalytically active material are applied to the particles of the pore former.

This involves fixing the powder particles, preferably by adhesion, to the particles of the pore former. Especially in the case of the inorganic pore formers, this is effected with the aid of an adhesion promoter or adhesive, for example an adhesive, with which, for example, the particles are wetted.

In the case of organic particles as pore formers, these are preferably heated, especially above the glass transition temperature thereof, but only to below the melting temperature thereof, such that they soften and the powder particles remain stuck to the surface after cooling. In this process, the use of an additional adhesion promoter in particular is dispensed with.

Finally, the powder particles can alternatively also be applied to the organic particles by electrostatic or chemical means.

The powder particles are preferably applied to the pore formers with the support of, or alternatively by, an additional force acting on the pore formers, for example by blowing them onto the organic particles, or by mixing, for example kneading, the pore formers together with the powder particles. Alternatively, the pore formers and the powder particles can be introduced together into a shaking apparatus.

As an alternative to the application of discrete powder particles to the particles of the pore formers, an outer layer of the initially catalytically inactive pore formers can be converted to the catalytically active layer, which forms the layer of the catalytically active material.

The particles of the pore former are converted here preferentially to a catalytically active zeolite structure, especially with retention of the mesoporous or macroporous particle shape thereof, at least at the outer layer thereof. The catalytic activity is achieved here especially through a metal ion exchange customary in the case of zeolites, especially Cu or Fe ions, or else through an additional metal ion intercalation. "Conversion" is therefore understood to mean a chemical conversion with retention of the (meso- and macroscopic) morphology of the particles. The framework structure formed is the tetrahedral crystal structure typical of a zeolite, especially composed of $SiO_{4/2}$—$AlO_{4/2}$ tetrahedra. Overall, therefore, particles having a zeolitic framework structure or nanostructure are formed at the interface.

Conversion to a zeolite is known in principle. A prerequisite for this is that the particles consist of a silicon oxide-containing and/or aluminium oxide-containing material, which is then converted with addition of further components suitable for the structure formation under the influence of temperature and pressure to the desired zeolite microstructure in the course of a synthesis.

The conversion is effected here by means of a hydrothermal crystallization. In this conversion, the respective particle is generally used as a substrate for a supported crystallization. In the case of the preferred use of kieselguhr particles (diatomaceous earth), the amorphous $SiO_2$ present in these particles is used as a silicon source for zeolite formation. The particles are introduced here into an aqueous reaction mixture comprising further components, especially an aluminium source and typically an organic template or a plurality of organic templates. These further components therefore constitute reactants for the desired network formation. The conversion and transformation, and also microstructure formation, are then effected by hydrothermal crystallization at an elevated temperature of typically 80 to 200° C. and autogenous pressure with a reaction time of typically several days, for example one to ten days. Subsequently, the crystalline material thus obtained, after the hydrothermal treatment, is washed, dried and calcined at temperatures of 400 to 800° C. The calcination serves particularly to burn out the organic reactants (templates). The conversion is effected preferably only in near-surface regions, such that a zeolitic surface layer is formed.

The conversion is preferably effected as far as a zeolite having the MFI (e.g. ZSM-5), BEA (e.g. beta), CHA (chabazite, especially aluminosilicate chabazite), AEI (e.g. ALPO 18, but preferably aluminosilicate AEI), ERI (e.g. erionite) or FER (e.g. ferrierite) framework structure. The zeolites are preferably also iron- or copper-exchanged after the conversion, with copper preferred for SCR catalysts.

As an alternative to this chemical synthesis, the conversion can also be effected, for example, by the intercalation of catalytically active sites into near-surface regions of the particles. In the case of use of a pillared clay material (PILC), for example, catalytically active cells are intercalated between the clay layers into the free spaces formed by the inorganic pillars. For this purpose, any of iron, copper, manganese or else cerium is intercalated.

In all cases, the powder particles form a layer surrounding the individual organic particles, which is preferably substantially closed, such that the individual organic particles thus cover the surface of the powder particles to an extent of 60% to 95%. Complete coverage of the surface of the organic particles is preferably not the aim; the coverage is therefore, for example, 90% of the surface area. This achieves, in a particularly advantageous manner, porosity of the active interface layer which forms after the sintering operation, such that accessibility to individual catalytically active sites within the catalytically active material is additionally improved. Alternatively or additionally, binder particles can penetrate into the free regions, such that the subsequent sintering operation results in ceramic bonding to the powder particles.

In an appropriate manner, the functional particles have a particle size in the range from 10 µm to 200 µm. More particularly, the particle size is in the range of 30-50 µm. The particle size depends here on the specific application and especially on a wall thickness of a catalyst body, for example a honeycomb catalyst. For wall thicknesses greater than 300 µm, preferably particle sizes in the range of 80-150 µm are used, and for wall thicknesses below 300 µm preferably particle sizes in the range of 30-70 µm. Through this particle size, it is possible to establish a desired, particularly suitable size of the catalytically inactive cells, especially the pores formed, in the final catalyst. The cells likewise have at least a similar size to the original pore formers, i.e. either the organic or inorganic particles.

To produce the catalytic composition, as well as the functional particles, further components which later form part of the ceramic composite are preferably added. More particularly, inorganic, catalytically inactive components are added as a binder component, these forming a ceramic support structure or matrix after the sintering operation, and ensuring the necessary mechanical stability, especially in the case of use of zeolites as catalytically active material.

A shaped body is preferably formed from the catalytic composition, especially by extrusion, and this is subsequently subjected to the thermal treatment. The catalytic composition therefore becomes a solid all-active body, especially an all-active extrudate, especially a honeycomb, in which individual walls are thus formed completely from the catalytic composition. This catalytic composition is especially a pasty, preferably extrudable, composition.

The extruded catalyst article can be coated with a washcoat, either a washcoat comprising the catalyst as described here or a different washcoat comprising another catalyst, i.e. a catalytically active material different from the catalytic composition. Thus, a catalytically active coating is additionally applied by means of the washcoat. A washcoat is generally understood to mean a suspension comprising binder components as well as catalytically active components. The washcoat is applied, for example, by dipping the catalyst into the suspension and then treating it thermally.

As an alternative to the application of the washcoat to the final, especially extruded catalyst, the catalytic composition processed as described above is itself applied as a washcoat to a monolithic support. The monolithic support is especially a catalytically inactive material, for example cordierite. This support is preferably likewise an extruded support in honeycomb form.

The catalytic composition is preferably produced with the aid of a mixing unit, especially a kneader, with mixing of the individual constituents and components with one another.

Appropriately—especially where organic particles are used as pore formers—in a single process step, the powder particles are first applied to the organic particles and then the individual components of the catalyst composition are mixed. This is appropriately accompanied by the simultaneous formation of the shaped body from this catalytic composition in this step as well. For this purpose, for example, a (twin-screw) extruder is supplied in an upstream region with the organic particles together with the powder particles, before the further components for formation of the catalytic composition are then added. Finally, at the end of the extruder, the shaped body is formed by extrusion.

The proportion of the pore formers and hence approximately also of the functional particles is appropriately within a range from 40% by volume to 80% by volume, based on the total volume of the individual components of the catalytic composition in the dry, pulverulent starting state of the catalytic composition, i.e. before water or other liquids are added for production of a suspension or of the pasty composition. By virtue of this comparatively high proportion of pore formers, a high-porosity structure is produced with the desired properties of high accessibility to the catalytically active interface layers. The proportion of the pore formers is especially such that formation of the desired cellular open-pore ceramic structure in the subsequent sintering step is assured, with the individual active interface layers of the individual at least porous cells joined to one another. The pore formers therefore have to be adjacent to one another, such that they are joined to one another via their catalytically active layers that form the active interface layers at a later stage.

The size and shape of the porous cells is dictated by the size and shape of the pore formers and can be spherical, spheroid, ovoid, ellipsoid, cuboid, tunnel-state (cylinder, prismatic column), slit etc.

In order to assure this, the catalyst composition is appropriately also pressurized during the production of the shaped body, especially by the extrusion, in order thus to achieve intimate contact between the functional particles.

Catalytically active material used for the powder particles is preferably at least one crystalline molecular sieve or a combination of two or more different kinds of crystalline molecular sieves.

Crystalline molecular sieve is understood here especially to mean zeolites in the narrower sense, especially crystalline aluminosilicates. Furthermore, crystalline molecular sieves are also understood to mean further molecular sieves that are not aluminosilicates but have a zeolitic framework structure, as apparent from the Zeolite Atlas of the Structure Commission of the International Zeolite Association (IZA-Sc). More particularly, this relates to silicoalumino-phosphates (SAPO) or else aluminophosphates (ALPO), which are likewise listed in the Zeolite Atlas mentioned.

Catalytically active components used here are especially molecular sieves having the CHA framework structure, especially chabazite, particularly aluminosilicate chabazite, for example SSZ-13 or SAPO-34, having the AEI framework structure, for example SSZ-39 or SAPO-18, having the ERI, MFI, BEA, FAU framework structure, especially Y zeolite, or the AFX or FER framework structure. Most preferred are so-called small pore crystalline molecular sieves, such as CHA, AFX and AEI framework structures, having a maximum pore opening structure of 8 tetrahedral atoms. Preferably, aluminosilicates are used as molecular sieves, especially for extruded catalysts, since the network structures show no change in the lattice spacings on water uptake and water release. (The nomenclature used here draws on the nomenclature used in the Zeolite Atlas).

Figure 6:
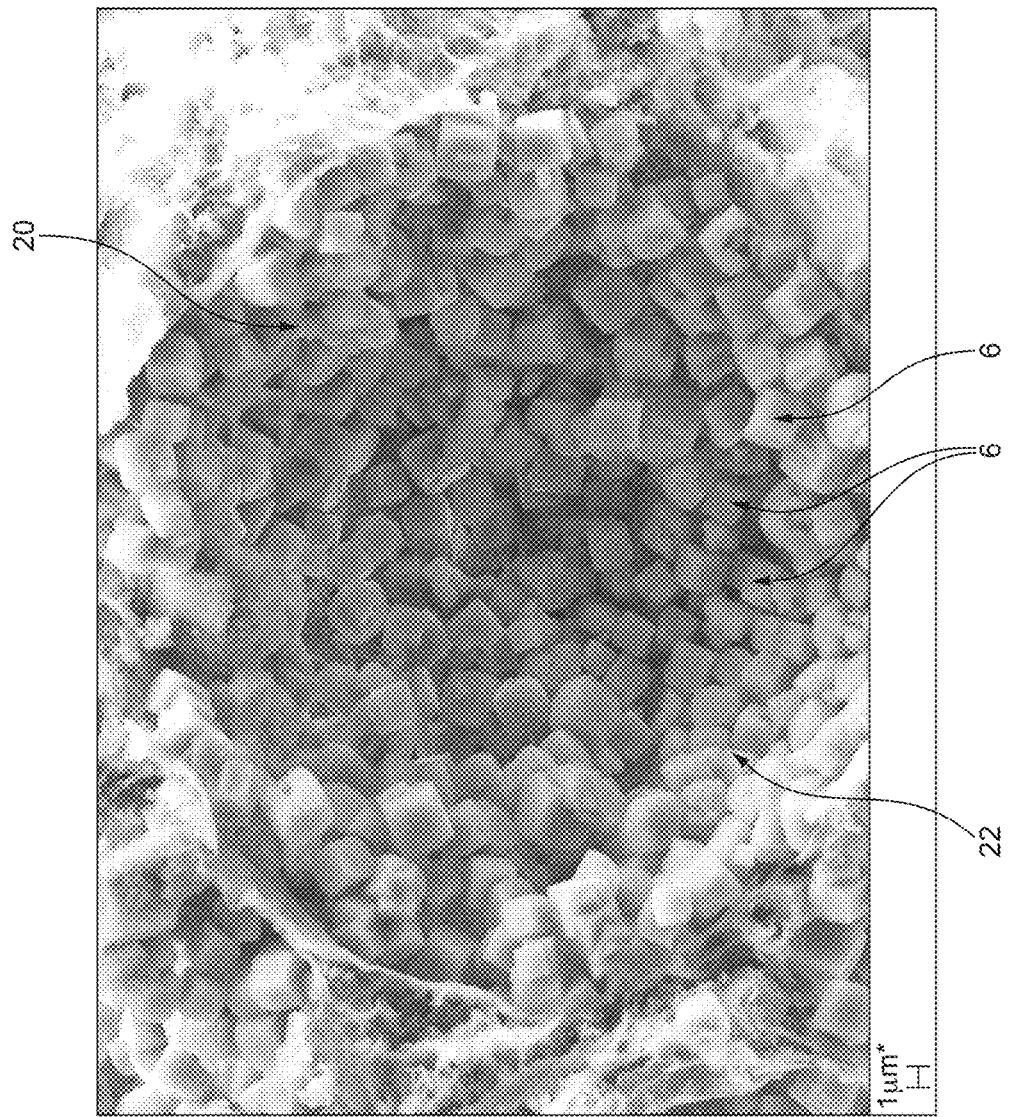

A feature of the catalyst article according to the present invention is that the individual crystalline molecular sieves can be present as individual crystals (crystallites) and not as an intergrown layer, as is shown in FIG. 6 as reference numeral 6. Thus, the process and catalyst article of the first and second aspects of the invention are distinguished from methods in which crystalline molecular sieves are grown on surfaces in situ, because such in situ grown crystalline molecular sieves are present as intergrowths.

All the framework structures and materials mentioned can be employed for use as the catalytically active material according to the present invention in an SCR catalyst. Appropriately, the molecular sieve generally contains a metallic activator (promoter). This is especially copper, iron or cerium, or a mixture thereof. Preference is given to using copper and/or iron. More particularly, the molecular sieve is a molecular sieve, especially zeolite, exchanged with such metal ions. As an alternative to the ion-exchanged molecular sieve, in which the metal ions have thus been incorporated into the framework structure, it is also possible that these metal activators have not been exchanged and hence are effectively present as "free" metals or metal compounds (e.g. metal oxides) in the individual channels of the molecular sieves, for example as a result of impregnation of the molecular sieve with a solution containing the compound. Another possibility is a combination of ion-exchanged metals and free metal compounds in the molecular sieve.

For catalyst articles comprising crystalline molecular sieves, such as SCR catalysts, wherein the molecular sieves are promoted with iron or preferably copper, highly preferred crystalline molecular sieves are those having—in addition to their inherent microporous structure—at least mesoporosity as a secondary pore system, as defined by the IUPAC definition discussed hereinabove. Most preferably, such crystalline molecular sieves having at least mesoporosity as a secondary pore system are present as single crystals (crystallites). Methods of making crystalline molecular sieves having at least mesoporosity as a secondary pore system include alkaline treatment and are discussed in the Review Article D. P. Serrano et al, Chem. Soc. Rev., 2013, 42, 4004.

Alternatively, or in combination with the molecular sieves, the material which is preferably active as an SCR catalyst comprises a catalytic system based on a base metal.

More particularly, the system here is a titanium-vanadium-based system with vanadium as catalytically active component. More particularly, different titanium-vanadium systems can be used. More particularly, oxidic systems comprising mixtures of titanium dioxide ($TiO_2$) and vanadium pentoxide ($V_2O_5$) are used. Alternatively, the titanium-vanadium system comprises vanadium-iron compounds as catalytically active component, including especially iron vanadate ($FeVO_4$) and/or iron aluminium vanadate ($Fe_{0.8}Al_{0.2}VO_4$).

In the case of the oxidic systems, these are especially titanium-vanadium-tungsten systems ($V_2O_5/WO_3/TiO_2$), titanium-vanadium-tungsten-silicon systems, titanium-vanadium-silicon systems. In the case of the second group comprising vanadium-iron compounds, these are titanium-vanadium-tungsten-iron systems, titanium-vanadium-tungsten-silicon-iron systems or titanium-vanadium-silicon-iron systems.

Alternatively, the catalytic system based on a base metal, a tungsten oxide-cerium oxide system or a stabilized tungsten oxide-cerium oxide system ($WO_3/CeO_2$) is used for the catalytic system.

The stabilized tungsten oxide-cerium oxide system is, for example, a zirconium-stabilized system comprising cerium-zirconium mixed oxides. Preferably, a transition metal, especially iron, is distributed within such a support material. The transition metals used are especially selected from the group consisting of Cr, Ce, Mn, Fe, Co, Ni, W and Cu and especially selected from the group consisting of Fe, W, Ce and Cu. The catalytic system is especially an Fe—W/$CeO_2$ or an Fe—W/$CeZrO_2$-System, as described particularly in connection with FIG. 3 of WO 2009/001131.

A further catalytic system for the catalytically active material comprises noble metal-based systems.

Preference is given to using PGM-based systems (platinum metal group, especially Ru, Rh, Pd, Os, Ir, Pt), for example Pt/aluminium oxide or, for example, Pt—Pd/aluminium oxide systems. These are used especially in diesel oxidation catalysts (DOCs) based on through-flow honeycomb catalyst arrangements or in the catalytically activated soot filters (catalysed soot filters).

The catalytically active systems detailed here all preferably serve for exhaust gas treatment, preferably in motor vehicles. In addition, it is also possible to use other catalytically active systems for other technical fields, for example the treatment of exhaust gases from stationary combustion plants such as power generation plants or industrial processes in which volatile organic components form. Alternatively, the catalyst can also be provided in the form of pellets, for example pellets for heterogeneous catalyses of chemical reactions. The catalytically active systems are typically provided in powder form and applied to the pore formers.

Correspondingly, in the final catalyst, the catalytically active interface layers which bound the cells and form the cellular, open-pore ceramic structure include one of the catalytically active systems mentioned as catalytically active material.

In addition to the functional particles, a further catalytically active material is preferably additionally introduced into the catalyst composition. This catalytically active material is optionally one of the catalytic systems cited above. Preference is given to using a titanium-based catalytic system, especially a $V_2O_5/WO_3/TiO_2$ system. In this way, it is thus not just the near-surface regions of the individual pores that are formed by a catalytically active material, but also the matrix. In this working example, the matrix is therefore not formed exclusively by the binder fraction. Since titanium-based systems are suitable for the production of all-active extrudates, combined systems of this kind can be processed efficiently by extrusion. At the same time, this achieves a particularly high catalytic activity. Catalytically active material used for the functional particles is preferably a zeolite.

By virtue of the specific production process with the functional particles, various possible designs matched to the particular application are generally available for the catalyst. For instance, preferably different particles for the pore formers which differ in terms of their particle size distribution can be used. Through this measure, it is therefore possible to set different cell sizes (pore sizes) in a controlled manner within the open-pore structure that will form at a later stage, in order, for example, to pass the exhaust gas to be treated effectively to the catalytically active sites.

In addition, in a preferred configuration, two or more different functional particles, especially different catalytically active powder particles, are used for the formation of the catalytically active layer and hence also for the catalytic composition. A mixture of two or more catalytically active materials, especially powder particles, can be used for a particular layer. As a result, a catalytically active interface layer of an individual cell will have different catalytically active materials at a later stage. Additionally or alternatively, different catalytically active material, especially powder particles, can be applied to the individual pore formers, such that different kinds of functional particles, which differ in terms of their catalytic activity, are thus provided. Therefore, a first catalytically active material is applied to first pore formers and a second catalytically active material to second pore formers, in order to form first and second functional particles. The first and second pore formers may be identical or else different here in terms of their physical composition.

In the final catalyst, the effect of this is that the catalytically active interface layers in various cells are formed from different catalytically active materials and/or different catalytically active materials are present within a catalytically active interface layer which bounds a particular cell. The different catalytically active materials, i.e. the different powder particles, are appropriately catalytically active materials optimized for different catalytic reactions. Through this measure, catalytically different reaction sites are therefore provided in immediate proximity at the local microstructural level. Effectively, microreactors are therefore provided. The catalytically active materials used are especially matched to one another in such a way that they are optimized, for example, for two successive chemical reactions. The different microreactors therefore form a kind of cascade in relation to the desired catalytic reactions. For example, in the SCR system, a first catalytically active material may be configured for a decomposition of $N_2O$, in order to obtain lower $N_2O$ slippage. Alternatively, a microreactor class may also be designed for formation of $NO_2$. The provision of a suitable "microreactor configuration" composed of different microreactors achieves an effective reduction in $NO_x$ levels.

In addition, this configuration of microreactors also results in the possibility, for example, of first breaking up and then converting, for example oxidizing, long hydrocarbon chains.

The object is additionally achieved in accordance with the second aspect of the invention by a catalyst article having the features of Claim 19, including a catalyst which has preferably but not necessarily been produced by the above-described process. The advantages cited with regard to the process and preferred configurations can be applied mutatis mutandis to the catalyst too. Preferred configurations are contained here in the dependent claims.

The catalyst article is a shaped body which is any of:
an extruded catalyst article consisting of the catalyst,
a honeycomb consisting of the catalyst,
a plate catalytic converter consisting of the catalyst,
pellets consisting of the catalyst,
a monolithic support body coated with a washcoat consisting of the catalyst,
a wall-flow filter comprising a honeycomb, wherein the honeycomb consists of the catalyst and/or the honeycomb has been coated with a washcoat composed of the catalyst.

The catalyst article may thus generally take different forms. For example, it is preferably an extruded catalyst, specifically a honeycomb catalyst. This may be coated with a washcoat comprising a catalytic composition according to the present invention or else another. The coating applied, i.e. the catalytically active material, is the same as or different from the extruded shaped body.

The catalyst can also be in the form of pellets, or as a monolithic support body coated with a washcoat. The washcoat preferably comprises the catalytic composition according to the present invention. In the latter case, a coating, which includes the active interface layers described here, has been applied to a support body, which is preferably in the form of an extruded body, especially honeycomb, or else alternatively in the form of a plate. The coating applied is either identical to or else different from the extruded body. Alternatively, the plate also consists of the catalyst and in this way also forms a plate catalytic converter composed of a catalytically active solid material.

Appropriately in this case, the monolithic support body to be coated with the washcoat takes the form of a filter body.

Alternatively, the catalyst, especially extruded catalyst, is configured as a filter having catalytic activity.

The catalyst article especially takes the form of a so-called wall-flow filter, in which the exhaust gas flows through porous walls in operation. The catalyst article comprises an extruded honeycomb from which the wall-flow filter has been produced. Alternatively, the wall-flow filter may also comprise an inert support to which a catalytic composition has been applied as a washcoat.

The catalyst article can be configured as a soot filter having catalytic activity.

The catalyst is, for example, a hydrocarbon trap, especially without additional catalytic coating. Catalysts of this kind are also referred to as cold-start catalysts, since they control the HC content in the exhaust gas on account of their storage capacity for hydrocarbons during the start phase of an internal combustion engine. A cold-start catalyst of this kind is described, for example, in WO 2012/166868 A1. A catalyst of this kind is configured especially as an extruded honeycomb catalyst with a crystalline molecular sieve, especially an ion-exchanged zeolite. In addition, it preferably contains a mixture of a molecular sieve of this kind with a noble metal, especially palladium (Pd) for example. The noble metal may also be added to the zeolite together with a base metal. Studies show that palladium-impregnated crystalline molecular sieves, especially without iron, likewise show the desired properties of a cold-start catalyst. Cold-start catalysts of this kind show, for example, good NOx storage and conversion capacity with high selectivity for $N_2$ at relatively low temperatures, good storage capacity and conversion of hydrocarbon at low temperatures, and improved carbon monoxide oxidation activity.

As an alternative to these preferably uncoated, extruded catalyst articles, for example in the form of a hydrocarbon trap, the catalyst article takes the form of a coated, extruded honeycomb catalyst, for example with the character of a hydrocarbon trap. This extruded honeycomb catalyst preferably again includes crystalline molecular sieves, preferably, for example, in the $H^+$ form and especially "unmetallized", i.e. without metallic activators. Alternatively, the crystalline molecular sieves contain palladium and/or silver. Extruded honeycomb bodies of this kind are provided with a catalytically active coating, especially for formation of a diesel oxidation catalyst or of a three-way catalytic converter, or it has been converted to a wall-flow filter which is subsequently coated with an oxidation catalyst, in order to form—in a similar manner to a diesel oxidation catalyst— what is called a catalysed soot filter (CSF). An example of a three-way catalytic converter can be found in WO 2011/092517 A1, and an example of an extruded diesel oxidation catalyst and of an extruded catalysed soot filter can be found in WO 2011/092519, for example.

This catalyst features cells bounded by a ceramic active interface layer of catalytically active material. The particular interface layer is especially a ceramic interface layer, meaning that the individual particles that form the interface layer are ceramic, i.e. are joined to one another by sinter bridges and thus form a solid material composite. The particular interface layer is preferably additionally, on account of the production process selected, at least substantially free of binder fractions. Therefore, in the active interface layer— apart from contamination at the interface between matrix and active material—only the catalytically active material is present, without additional binder components.

Preferably, the individual active interface layers can be joined to one another to form a cellular ceramic and open-pore structure. The individual cells and active interface layers enclosing them are therefore not arranged in an isolated manner, but form a coherent structure. A cellular structure is generally understood to mean a material structure in which a multitude of individual cavities or high-porosity material regions—formed by the pore formers—are joined to one another by means of cell walls. The cell walls are formed by the interface layers joined to one another.

These active interface layers are preferably porous and not entirely impervious, such that good mass transfer is assured for the intended catalytic reaction overall.

The specific production process additionally forms, on the side of the catalytically active interface layers facing away from the cells, a binder matrix which forms a mechanically stable support structure and matrix. Overall, this gives the catalyst a sufficiently high mechanical stiffness and especially strength. Therefore, for the active interface layers, it is also possible to employ materials which cannot be sintered or can be sintered only poorly to give a solid body.

The matrix can be appropriately at least substantially free of catalytically active material. The catalytic activity is therefore provided exclusively by the interface layers of the catalytically active material. Only through contamination effects can catalytically active material pass from the catalytically active interface layers into the matrix which takes the form of a pure binder matrix. "At least substantially free of catalytically active material" is therefore understood to mean that catalytically active components are incorporated into the matrix in the interface to the catalytically active interface layer, if at all. The proportion of the catalytically active components in the matrix is especially below 10% of the proportion in the case of a hypothetical homogeneous distribution of the active components within the overall catalyst.

Preferably, in addition to the active interface layers, catalytically active material is also present in the matrix. For this purpose, additional catalytically active material is added to the catalyst composition in the course of production. This additionally catalytically active material preferably differs from the material present in the active interface layer.

In the case of use of different size distributions for the particles of the pore former, finally, cells/pores of different size classes are formed in advantageous executions.

In addition, preferably the cells having the active interface layers form different reactive sites in different configurations. For this purpose, the active interface layers of the various cells are different. The active interface layers of different cells can be formed from different catalytically active materials, i.e. the catalytically active material of a first interface layer of a first cell is different from that of a second interface layer of a second cell. Alternatively or additionally, different active materials are present within an interface layer which bounds a particular cell, i.e. an active interface layer of a particular cell contains two or more different catalytically active materials.

A pore volume formed by the pores is preferably in the range between 40% by volume and 80% by volume, based on the total volume of the catalyst. The remaining bulk volume is divided between the catalytically active interface layers and the mechanical support structure and matrix formed by the binder matrix. The catalytically active interface layers account for about 20% by volume to 80% by volume, based on the bulk volume remaining.

The layer thickness of the active interface layer is preferably in the range from 0.5 to 20 μm and especially in the range from 1 μm to 10 μm. The layer thickness is generally within the region of the particle size of the functional particles, which is indeed preferably within the ranges mentioned.

Preferably, the catalyst is an SCR catalyst, i.e. has catalytic activity with regard to the desired de-NOx reaction. It is configured especially for the exhaust gas treatment in motor vehicles.

A preferred material active as an SCR catalyst for the present invention is disclosed in WO 2014/027207. This discloses, for example, a catalytic composition for an exhaust gas treatment, comprising a mixture of a first component and a second component. The first component is an aluminosilicate or iron silicate molecular sieve, and the molecular sieve is either in the $H^+$ form or has been ion-exchanged with one or more transition metals. The second component is a vanadium oxide on a metal oxide support selected from aluminium, titanium, zirconium, cerium, silicon and combinations thereof.

The different catalytic systems described here are used either individually or else in combination. More particularly, a mixture of the titanium-vanadium-based system with crystalline molecular sieves is used here. A mixed catalyst of this kind comprises, as the first component, especially an aluminosilicate or iron silicate molecular sieve, which is either in the $H^+$ form or has been ion-exchanged with one or more transition metals, especially with iron. This first component is preferably present in the active interface layers that bound the pores. The second component is a vanadium oxide in a metal oxide support selected from aluminium, titanium, zirconium, cerium, silicon or combinations thereof. More particularly, the support material of the second component is titanium oxide. This second component is preferably present in or forms the binder matrix (cf. WO 2014/027207 above).

The object is additionally achieved in accordance with a third aspect of the invention by functional particles for use for a production process described here or else for use for a catalyst described here. It is a feature of functional particles of this kind that pore formers, especially organic or porous inorganic, catalytically inactive particles, are surrounded by a completely or partially closed layer of a catalytically active material.

This layer is especially formed by a powder layer consisting of powder particles of a catalytically active material. The powder particles here have been bonded individually and loosely on the surface of the organic particles, without chemical or ceramic bonding to one another in the starting state. These functional particles are provided as a starting component for the process described above.

Figure 2:
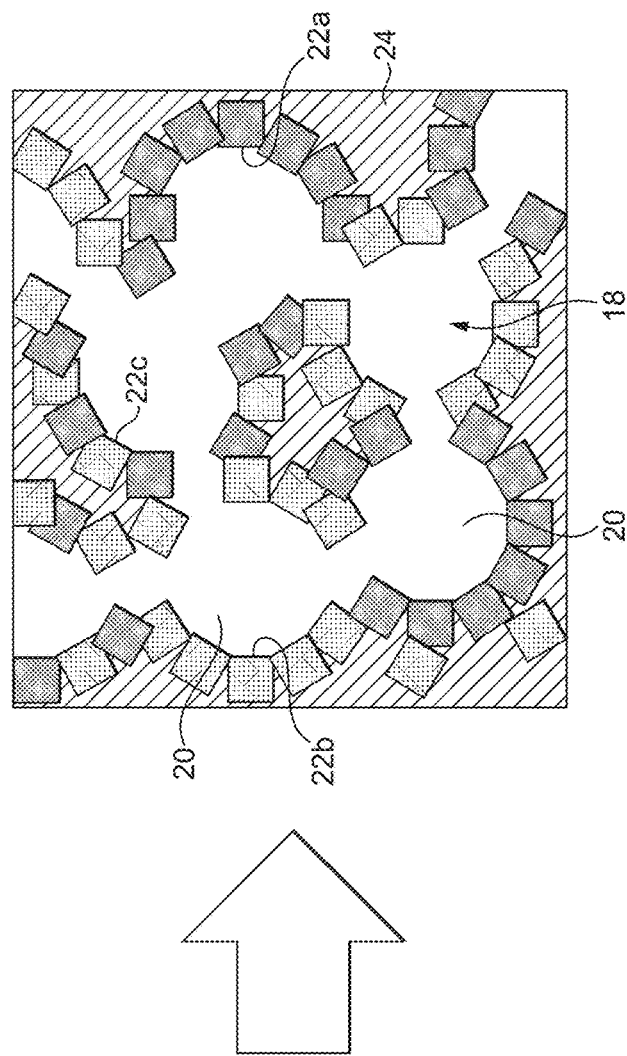
Figure 2:
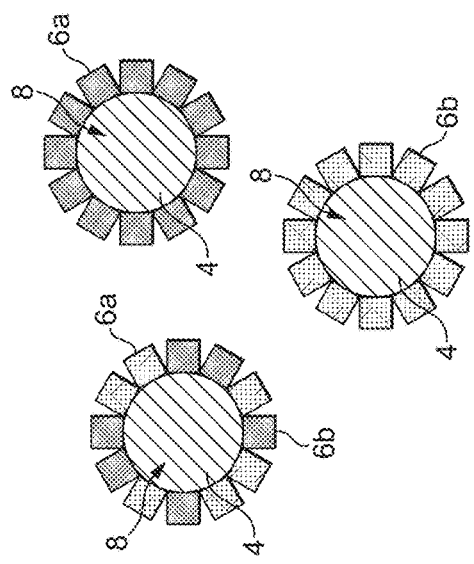
Figure 3:
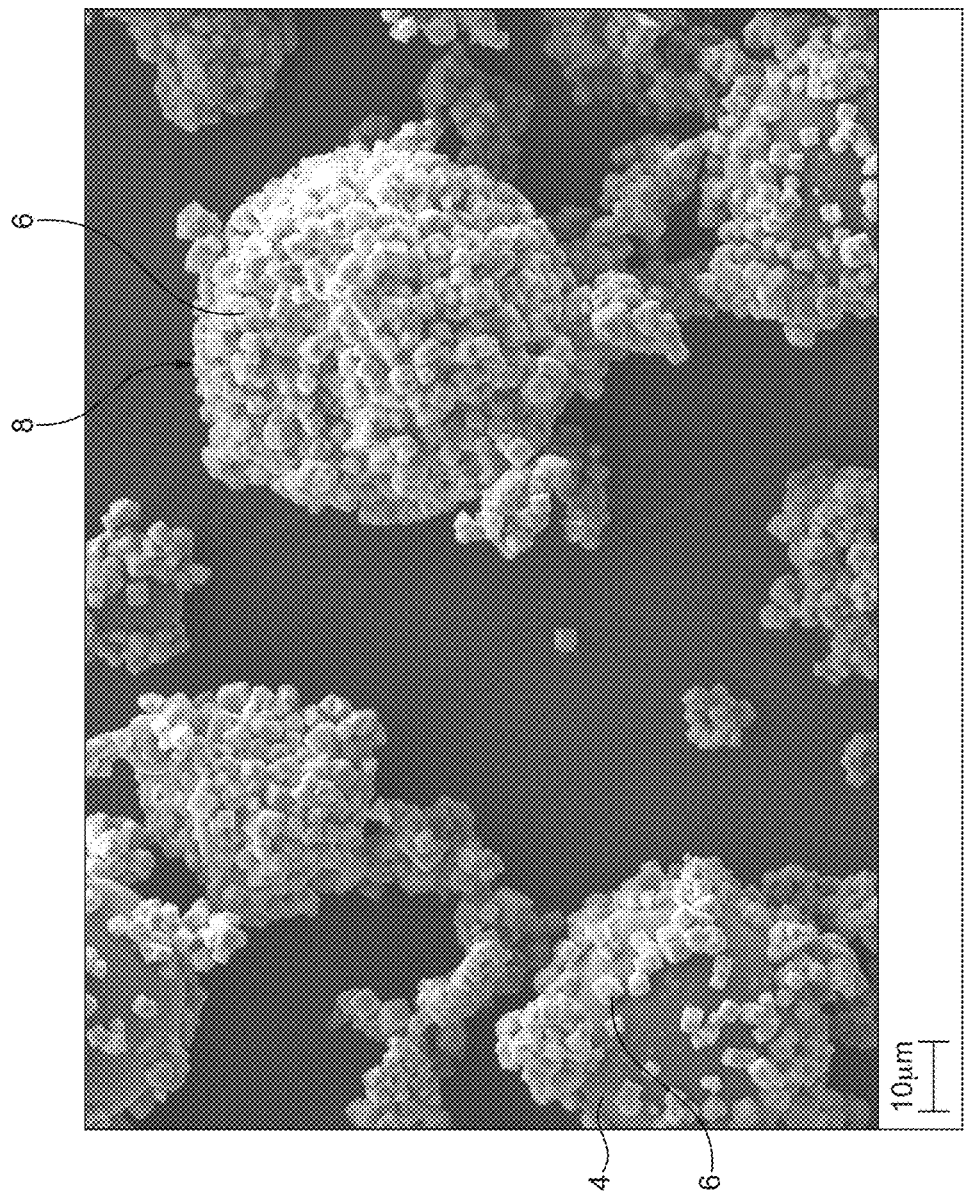
Figure 4:
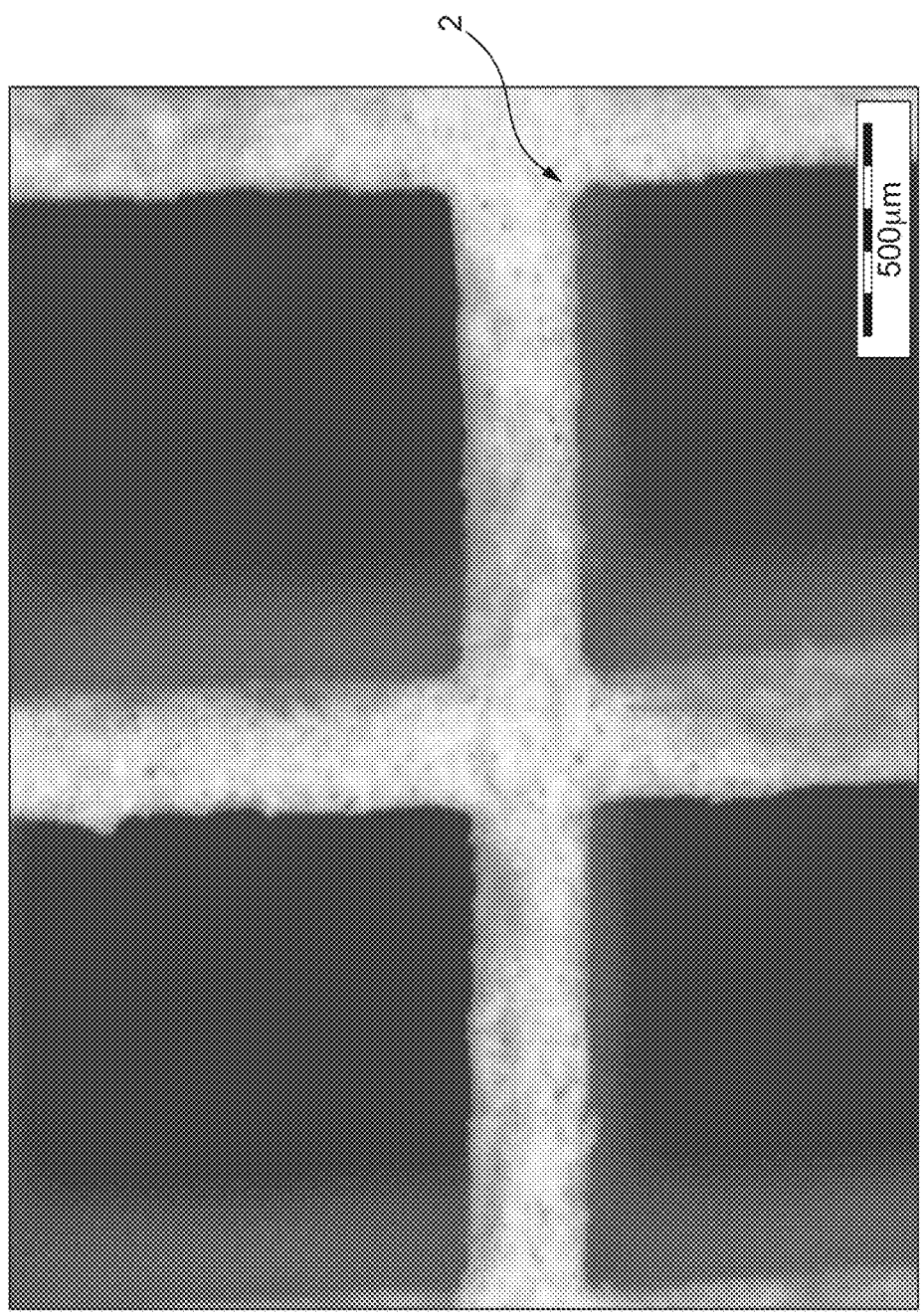
Figure 5:
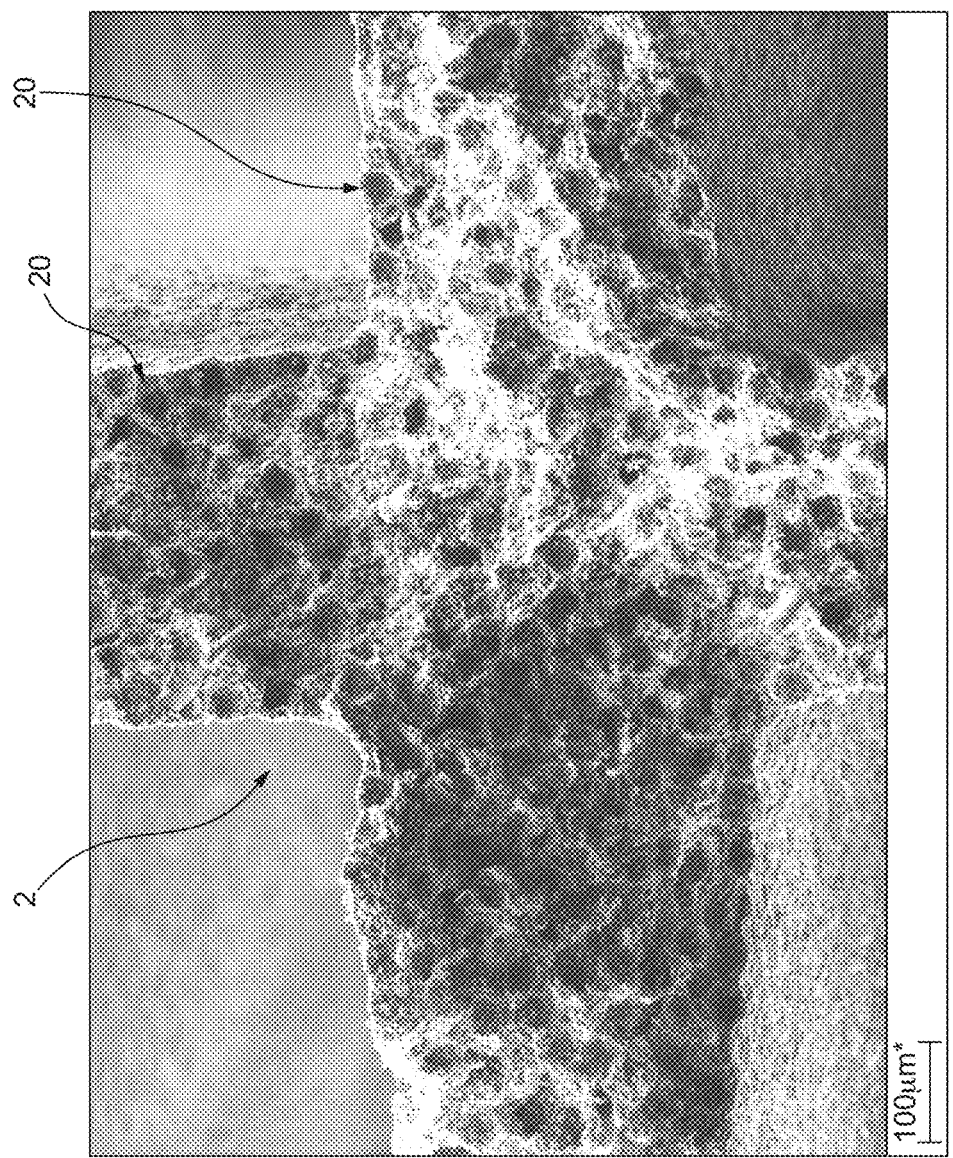

A working example of the invention is explained in detail hereinafter with reference to the figures. The figures show:

FIG. 1 a schematic diagram of the production process of a catalyst,

FIG. 2 a simplified schematic diagram for illustration of the use of different functional particles, FIG. 3 an SEM image of the functional particles, FIG. 4 a detail from an image of an extruded honeycomb catalyst, FIGS. 5 and 6 the honeycomb catalyst shown in FIG. 4 at different enlargements.

With reference to FIG. 1, the production of a catalyst 2 and of a catalyst article 17 formed by the catalyst 2 is elucidated hereinafter. The catalyst article 17 is especially an extruded SCR honeycomb catalyst. However, the use of this process is not restricted to an SCR catalyst article 17 of this kind, nor to an extruded honeycomb catalyst. The principles of the process can generally be applied to a wide variety of different catalysts which differ both in terms of their structure and in terms of the catalytically active materials used therein.

In the embodiment shown in FIG. 1, in a first step, as pore formers, organic particles 4 and powder particles 6 of a catalytically active material are provided. This catalytically active material is especially a zeolite, preferably an ion-exchanged zeolite, more particularly a copper ion-exchanged zeolite. The individual powder particles typically have a particle size in the range of 1-10 μm. The organic particles 4 are polymer particles, especially spherical particles or the like, consisting, for example, of polyethylene or other thermoplastics or elastomers.

In the next step, functional particles 8 are produced from these two starting materials. For this purpose, the organic particles 4 and the powder particles 6 are mixed with one another and preferably heated to above the glass point of the organic particles 4, such that they soften. As a result, the powder particles 6 stick to the surface of the organic particles 4 after cooling and form an at least substantially continuous powder layer on the surface of the particles 4, which forms a layer 5 around the particles 4.

As an alternative to the functional particles 8 described here, having the organic particles 4 as pore formers, it is also possible to use inorganic, porous particles as pore formers. In the case of these too, in a first variant, the layer 5 is formed by applied powder particles 6. Alternatively, the layer 5 of catalytically active material can also be formed by a catalytic activation of the surface of the particles 4.

In all cases, the layer 5 is in at least substantially closed form and has a coverage level of the particle 4 preferably in the range from 60% to 95%.

In the next step, the functional particles 8 are mixed with a further component, especially a binder component 10, for formation of a catalytic composition 12. This is effected, for example, by a kneading operation or another mixing operation, especially with thermal action. Binder components used here are inorganic binders as generally employed for the formation of extrudable catalytic compositions 12. Suitable binder components 10 are especially clays, for example bentonite, refractory clay, kaolin, or else metal oxides such as aluminium oxide, cerium oxide, or else sols based on aluminium oxide, silicon oxide or titanium oxide. These binder components 10 may be supplemented, if required, with further organic sintering aids or else support elements, for example support fibres. The proportion of these additional binder components 10 is, for example, within the range from 25 to 35% by volume. The remaining 65-75% by volume of the catalytic composition 12 (based on the dry state, without addition of liquids) are therefore formed by the functional particles 8. In addition to these constituents, organic extruding aids may also be added.

The organic particles 4 have a particle size typically in the range from about 10 to a maximum of 200 μm and preferably from 10 to a maximum of 100 μm.

The catalytic composition 12 produced in this way is subsequently extruded to form a shaped body 14. In the course of extrusion, a pressure is applied to the catalytic composition 12. This presses the individual functional particles 8 against one another, such that they are in mutual contact with their powder particles 6. After the extrusion, as usual, the shaped body 14 is dried, calcined and subsequently sintered, so as to obtain the final catalyst 2 and hence also the catalyst article 17 in the form of the honeycomb catalyst.

This is shown in FIG. 1, merely in the form of a schematized structure. As can be inferred from this, the catalyst 2 has an open-pore pore structure 18 consisting of several cells joined to one another, which are formed when organic pore formers are used as pores 20. The individual pores 20 are bounded in each case by an active interface layer 22 which forms the cell wall. This active interface layer 22 is formed by the powder particles 6, which are now sintered to one another, i.e. the catalytically active material. These active interface layers 22 are therefore at least substantially free of the binder component 10. The side of the active interface layer 22 facing away from the pores 20 adjoins the binder material, which thus forms a binder matrix 24 as support structure and matrix. The pore structure 18 has therefore been formed within the binder matrix 24, with each of the pore walls formed by the active interface layers 22. The connection of the individual pores 20 to one another is formed in the extrusion and the sintering operation and is favoured by the close proximity of the individual functional particles 8 in the catalytic composition 12. It is particularly advantageous in this context that the catalytic composition 12 is produced by the kneading or subsequent extrusion, in which high compressive forces are exerted. Overall, an open porous cellular wall structure has therefore been formed.

The process has been elucidated in the context of FIG. 1 with reference to the use of a zeolite as catalytically active material. The process concept described here, however, is not restricted to the use of a zeolite. The basic process steps and stated parameters can also be applied to other catalytically active materials. The functional particles 8 produced at the intermediate stage can additionally also be employed for other production processes, for example for formation of a suspension which is then applied to a support body which has been extruded, for example, for formation of a washcoat.

Through the provision of the functional particles 8, various adjustments in the properties of the catalyst 2 are possible in a simple manner. One way of doing this is illustrated in detail by FIG. 2. This shows, in schematic form, three kinds of functional particles 8 which differ with regard to the coating thereof with the powder particles 6. Thus, one kind of functional particles 8 has been configured with a first kind of powder particles 6a, a second kind with a second kind of powder particles 6b, and a third kind of functional particles 8 with a mixture of these two powder particles 6a, 6b. In the final catalyst 2, the effect of this is that the pores 20 are bounded by different active interface layers 22a, 22b, 22c. In one case, the pores 20 are thus bounded by the first catalytic composition of the powder particles 6a/the second catalytic composition as per the powder particles 6b or else by a catalytic composition formed from the mixture of these two powder particles 6a, 6b. In this way, different catalytic sites are provided in the immediate surroundings.

A catalyst 2 produced by the process described using PVC granulates as organic particles 4 exhibits a distinct improvement in catalytic efficiency compared to conventionally produced catalysts. In the case of the SCR honeycomb catalyst based on a zeolite as catalytically active material, which has been described here. In the Table below, the nitrogen oxide conversion rate is given against temperature, once for an inventive catalyst 2 and once for a comparative catalyst: the comparative catalyst employed was an extruded honeycomb catalyst having a proportion of 67% by volume of a copper ion-exchanged zeolite having an aluminosilicate CHA framework type structure. The remaining fractions consist of a catalytically inactive binder component 10. The catalysts 2 are extruded honeycomb catalysts having a cell density of 200 cpsi (cells per square inch). The extrudate was freeze dried using the method disclosed in WO 2009/080155 and calcined at 600° C. for 2 hours.

The inventive catalyst 2 used for comparison is composed of the same constituents, but with different proportions. Thus, the zeolite content has been reduced from 67% by volume to 35% by volume. At the same time, the proportion of the binder components has been increased from 10% by volume to 65% by volume.

To check the catalytic activity, the honeycomb catalyst was contacted with an exhaust gas to be treated at a space velocity SV of 120 000 per hour. The exhaust gas here contained a proportion of 100 ppm of $NO_x$ (with zero $NO_2$) with addition of 100 ppm of $NH_3$. At the catalyst outlet, the residual proportion of nitrogen oxides $NO_x$ was then measured and expressed as a ratio to the proportion of nitrogen oxides in the exhaust gas on the inlet side to determine the $NO_x$ conversion rate. The $NO_x$ conversion rate was determined at a temperature range from about 180 to 500 degrees. The results are set out in the Table below.

TABLE 1

NO$_x$ conversion and derived catalyst activity (defined as NOx conversion normalized by catalyst mass) for different temperatures (conditions: NO$_x$ = NH$_3$ = 100 ppm (NO$_2$ = 0 ppm), H$_2$O = 7%; O$_2$ = 9.3%; SV = 120000 h$^{-1}$).

|  | NO$_x$ Conversion [%] | | | | Catalyst Activity* [%/g$_{catalyst}$] | | | |
|---|---|---|---|---|---|---|---|---|
|  | Temperature [° C.] | | | | | | | |
|  | 180 | 250 | 400 | 500 | 180 | 250 | 400 | 500 |
| Catalyst A | 36.3 | 64.8 | 74.5 | 69.7 | 2.1 | 3.7 | 4.3 | 4.0 |
| Catalyst B | 32.5 | 73.6 | 80.5 | 75.1 | 3.2 | 7.2 | 7.9 | 7.4 |

*NO$_x$ conversion normalized by catalyst mass

As is immediately apparent, the inventive catalyst 2, in spite of the lower proportion of catalytically active composition by nearly a factor of 2 therein, in terms of the conversion rate, is well above the conversion rate of the comparative catalyst in virtually all temperature ranges. A further advantage of the inventive catalyst 2 is its comparatively lower weight. The catalyst 2 has a significantly better conversion by mass, as also indicated in the Table.

The SEM image in FIG. 3 once again shows the actual features of the functional particles 8. Clearly apparent here are the individual powder particles 6 which have been applied to the surface of the organic particles 4 and form a more or less continuous layer. Uncovered surface regions are fundamentally desirable for achieving a certain porosity of the active interface layer 22 ultimately formed. In addition, this promotes the formation of the open-pore cellular structure. The individual powder particles 6 are deposited on the surface of the organic particles 4 preferably in one layer or in a few layers. There is isolated formation of agglomerates.

FIG. 4 shows an image of a detail of an extruded honeycomb catalyst 2, here with rectangular flow channels through which the exhaust gas flows in operation. The catalyst 2 thus takes the form of an all-active extrudate in which the individual walls that bound the individual flow channels are formed from the catalytic composition 12.

In FIGS. 5 and 6, the (coarse) pore structure that forms is clearly apparent. In addition, it is also possible to see, in the images shown here, how the individual pores 20 are at least partly joined directly to one another, such that an open pore structure is formed overall. Also clearly apparent are the porous active interface layers 22, which are formed by the individual powder particles 6, now ceramically joined to one another.

LIST OF REFERENCE NUMERALS 2 catalyst
4 pore former
5 layer
6 powder particles
8 functional particles
10 binder component
12 catalytic composition
14 shaped body
17 catalyst article
18 pore structure
20 cells
22 active interface layer
24 matrix

The invention claimed is:

1. A process for producing a ceramic catalyst, the process comprising:
   a) processing functional particles with inorganic particles to form a catalytic composition, the functional particles having a catalytically inactive pore former as a support surrounded by a layer of a catalytically active material; and
   b) calcining the catalytic composition to form a ceramic catalyst, wherein the ceramic catalyst comprises at least porous catalytically inactive cells
       which are formed by the pore formers in the functional particles,
       which are embedded in a matrix comprising the inorganic particles,
       which form a porous structure and
       which are at least partly surrounded by an active interface layer comprising the catalytically active material of the layer of the functional particles.

2. The process of claim 1, wherein the pore formers consist of an organic material comprising thermoplastics or elastomers.

3. The process of claim 1, wherein the pore formers consist of an inorganic porous material having at least mesoporosity.

4. The process of claim 3, wherein the inorganic material is selected from a clay mineral, diatomaceous earth, silica gel, and porous glass.

5. The process of claim 3, wherein the pore formers consist of an inorganic porous material having macroporosity.

6. The process of claim 1, wherein powder particles of the catalytically active material have been applied to the pore former.

7. The process of claim 1, wherein the layer is formed by converting an outer layer of the catalytically inactive pore formers to the catalytically active layer.

8. The process of claim 1, wherein the pore formers have a particle size in the range of from 10 µm to 200 µm.

9. The process of claim 1, wherein the inorganic particles comprise a binder component wherein, after the treatment in step b), the binder component forms a ceramic matrix.

10. The process of claim 1, further comprising forming a shaped body from the catalytic composition by extrusion and then thermally treating the shaped body.

11. The process of claim 1, wherein the catalytic composition is applied as a washcoat to a monolithic support and the coated support is then treated thermally.

12. The process of claim 1, wherein the application of the layer to the pore former for formation of the functional particles and the processing of the catalytic composition are conducted in a single process step.

13. The process of claim 1, wherein the pore formers account for a proportion in the range of from 40% by volume to 80% by volume, based on the dry catalytic composition.

14. The process of claim 1, wherein catalytically active materials used are any one or more of:
   a crystalline molecular sieve;
   a tungsten/cerium-based catalytic system;
   a metal oxide or mixed oxide comprising one or more titanium oxide, vanadium oxide, tungsten oxide, or a combination thereof; or
   a platinum group metal-based system.

15. The process of claim 14, wherein the crystalline molecular sieve is present as individual crystallites.

16. The process of claim 14, wherein the crystalline molecular sieve has at least mesoporosity as defined by the IUPAC definition in addition to their inherent microporosity.

17. The process of claim 14, wherein the metal oxide or mixed metal oxide of the catalytically active material comprises a titanium-vanadium-tungsten system, a titanium-vanadium-tungsten-silicon system, a titanium-vanadium-silicon system, a titanium-vanadium-tungsten-iron system, a titanium-vanadium-tungsten-silicon-iron system, a titanium-vanadium-silicon-iron system, an iron vanadate system and/or and an iron aluminum vanadate system.

18. The process of claim 1, further comprising introducing particles of another catalytically active material into the catalytic composition in step a).

19. The process of claim 1, wherein the pore formers have differing particle size distribution.

20. The process of claim 1, wherein the catalytic composition comprises two or more different functional particles which differ in terms of the catalytically active material used for the layer, wherein:
    a mixture of two or more different catalytically active materials is used for the layer; and/or
    a different catalytically active material is applied to each of the individual pore formers,
    and where first and second functional particles are obtained and mixed to form the catalytic composition.

21. A catalyst article comprising a catalyst having a composite structure having a porous structure embedded into an inorganic matrix, wherein the porous structure is formed from catalytically inactive, at least porous cells at least partly surrounded by an active interface layer comprising a catalytically active material, wherein said catalyst article is any of:
    an extruded catalyst article consisting of the catalyst,
    a honeycomb consisting of the catalyst,
    a plate catalytic converter consisting of the catalyst,
    pellets consisting of the catalyst,
    a monolithic support body coated with a washcoat consisting of the catalyst,
    a wall-flow filter comprising a honeycomb, wherein the honeycomb consists of the catalyst and/or the honeycomb has been coated with a washcoat composed of the catalyst.

22. The catalyst article of claim 21, wherein the ceramic matrix is at least substantially free of catalytically active material.

23. The catalyst article of claim 21, having two or more different catalytically active materials, wherein
    the catalytically active material in an active interface layer that bounds a first cell is different from the catalytically active material in an active interface layer that bounds a second cell and/or
    an active interface layer that bounds a particular cell contains two or more different catalytically active materials.

24. The catalyst article of claim 21, wherein the catalytically active material is selected from
    a crystalline molecular sieve;
    a tungsten/cerium-based catalytic system;
    a metal oxide or mixed oxide comprising one or more titanium oxide, vanadium oxide, tungsten oxide, or a combination thereof; or
    a platinum group metal-based system.

25. The catalytic article of claim 24, wherein the metal oxide or mixed metal oxide of the catalytically active material comprises a titanium-vanadium-tungsten system, a titanium-vanadium-tungsten-silicon system, a titanium-vanadium-silicon system, a titanium-vanadium-tungsten-iron system, a titanium-vanadium-tungsten-silicon-iron system, a titanium-vanadium-silicon-iron system, an iron vanadate system and/or and an iron aluminum vanadate system.

26. Functional particles which comprise a pore former which takes the form of a support surrounded by a layer of a catalytically active material, wherein the pore former consists of an organic material comprising thermoplastics or elastomers, or wherein the pore former consists of an inorganic porous material having at least mesoporosity.

* * * * *